(No Model.) 2 Sheets—Sheet 1.
J. D. SCHOFIELD.
PLANTER.
No. 588,486. Patented Aug. 17, 1897.
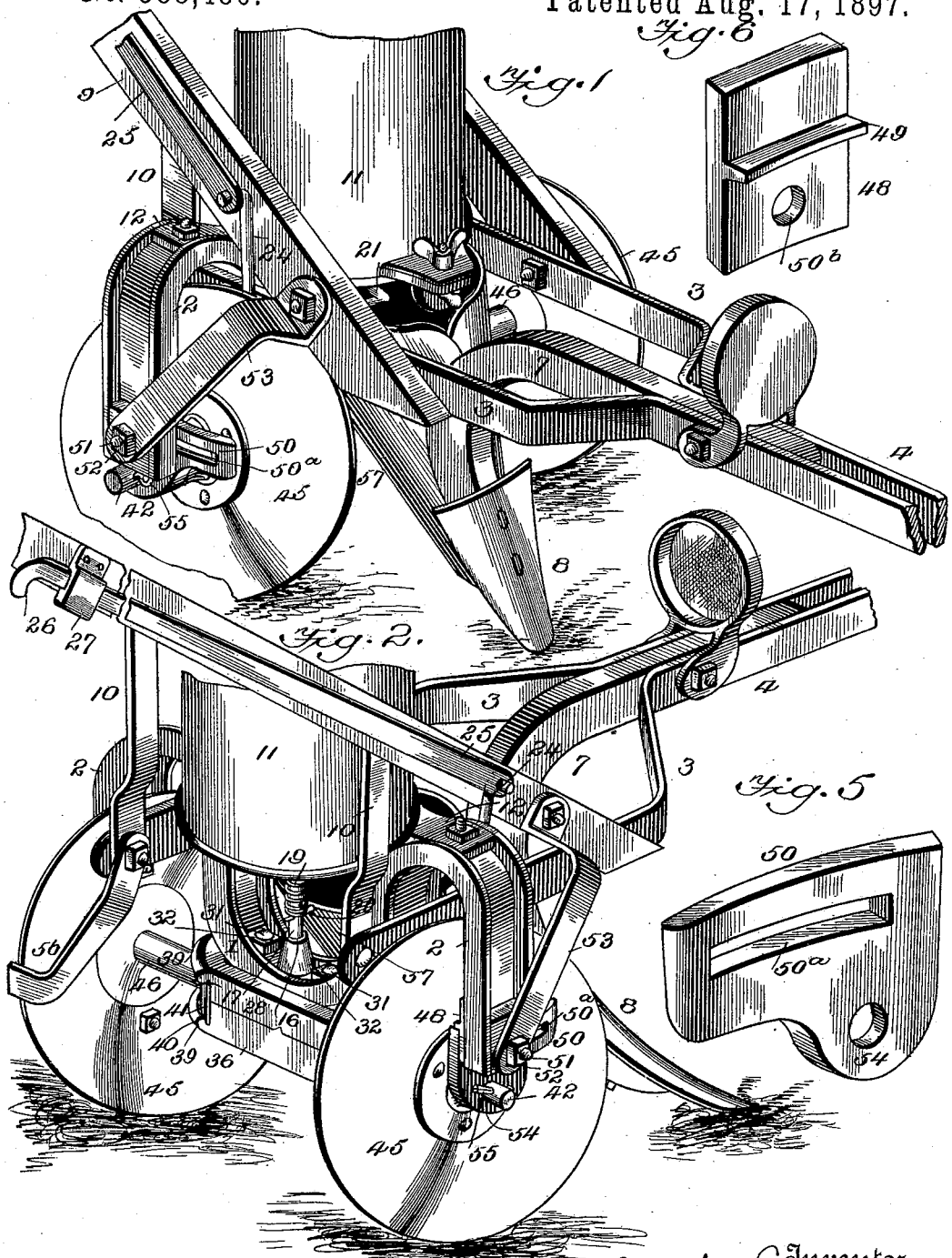

(No Model.) 2 Sheets—Sheet 2.
J. D. SCHOFIELD.
PLANTER.
No. 588,486. Patented Aug. 17, 1897.
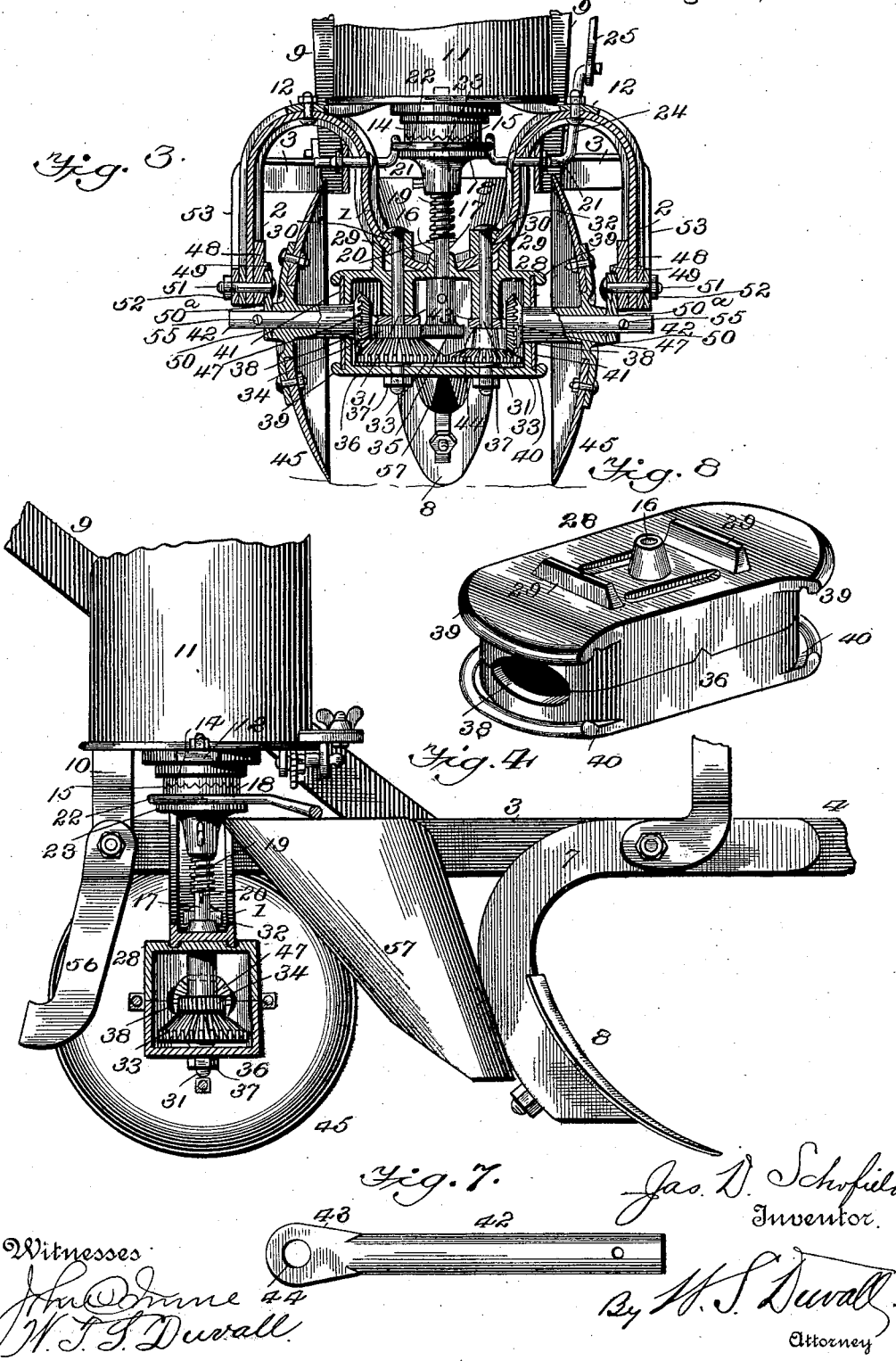

UNITED STATES PATENT OFFICE.

JAMES DROMMOND SCHOFIELD, OF DALLAS, TEXAS.

PLANTER.

SPECIFICATION forming part of Letters Patent No. 588,486, dated August 17, 1897.

Application filed August 27, 1896. Serial No. 604,115. (No model.)

*To all whom it may concern:*

Be it known that I, JAMES DROMMOND SCHOFIELD, a citizen of the United States, residing at Dallas, in the county of Dallas and State of Texas, have invented certain new and useful Improvements in Planters; and I do hereby declare the following to be a full, clear, and exact description of the invention, such as will enable others skilled in the art to which it appertains to make and use the same.

My invention relates to improvements in planters, and has particular reference to the operating gear mechanism in that class of planters illustrated, described, and claimed in United States Patent No. 545,824, granted me September 3, 1895.

The objects of my present invention are to produce in a simple and inexpensive manner a planter wherein the seeding mechanism is operated through the medium of the covering-disks; wherein the said covering-disks, together with their axles, may be conveniently and relatively adjusted without in any way impairing or altering the positive driving of the seeding mechanism; wherein all gearing is covered and protected from grit and dust, and, finally, wherein a convenient means is provided for throwing the drive mechanism out of operative engagement with the seeding mechanism when occasion requires and for automatically returning these parts to operative engagement when released.

Other objects and advantages of my invention will hereinafter appear, and the novel features thereof will be particularly pointed out in the claims.

Referring to the drawings, Figure 1 is a perspective view of my improved planter. Fig. 2 is a rear perspective view of the same. Fig. 3 is a vertical transverse sectional view, the hopper being shown in elevation. Fig. 4 is a vertical longitudinal sectional view at one side of the center of the yoke-frame casting. Fig. 5 is a perspective view of the adjustable plate in which the axles are journaled. Fig. 6 is a perspective view of the block for supporting the axle-supporting plates. Fig. 7 is a detail of one of the axles. Fig. 8 is a detail of the gear-box.

Like numerals of reference indicate like parts in all the figures of the drawings.

In carrying out my invention I employ the metal yoke-frame, the same comprising the central depressed portion 1 and the opposite depending terminals 2, said frame being constructed preferably of I-iron. Bolted securely to the opposite sides of the depressed center 2 of this yoke-frame are the forwardly-disposed steel frame-bars 3, which at a suitable distance in advance of the yoke-frame converge and are bolted together, so as to produce the beam 4. A gooseneck-standard 7 is bolted at its upper end between the frame-bars at the point where they converge, and at its lower end is provided a furrow-opening shovel 8.

Bolted pivotally at their lower ends to the opposite frame-bars is a pair of rearwardly and upwardly disposed divergent handle-bars 9, and braces 10 adjustably connect the same to the rear ends of said frame-bars immediately back of the yoke-frame.

The hopper 11 is of the usual construction and is supported between the handle-bars and upon the upper curved portions or shoulders of the yoke-frame by means of lateral lugs 12, that project therefrom and which rest upon and are bolted to the said frame. The bottom of the hopper is provided with an opening, and designed to revolve in the bottom and in the opening is the seed-disk, the same preferably having in this instance a depending hub 14, that extends below the bottom of the hopper and is provided with an annular series of inclined ratchet or clutch teeth 15. The seed-disk has a central opening which is in vertical alinement with a similar flanged opening 16, formed in the center of the yoke-frame, and in these two openings there is loosely journaled for rotation a vertical drive-shaft 17, the lower end of which projects below the yoke-frame. Arranged for loose reciprocation upon the drive-shaft immediately below the hopper is a toothed clutch-collar 18, the same being designed to rotate with the shaft. The teeth of this collar are oppositely inclined to those on the seed-disk and are normally held in operative engagement therewith through the medium of a coiled expansion-spring 19, arranged upon the drive-shaft and compressed between a pin 20 and the lower end of the collar.

A light rock-shaft 21 is journaled in opposite bearings formed for that purpose in the frame-bars at points between the yoke-frame and the handle-bars. This rock-shaft at its center is provided with a rearwardly-curved loop or arm 22, which loosely encircles the clutch-sleeve and rests upon an annular flange 23, with which said clutch-sleeve is provided below its teeth. One end of the rock-shaft beyond its bearing is formed with a crank-arm 24, and loosely connected to the same is a reciprocating operating-rod 25, which has its rear end bent to form a handle 26, located adjacent to one of the grips of the handle-bar, and in advance of the same is supported in a keeper 27, located on said handle-bar. It will be obvious that if at any time the operator desires to arrest the feed of corn or seed—as, for instance, when turning the machine at the end of a furrow or traveling from field to field—he needs only to withdraw or reciprocate the operating-rod to the rear, which will cause such a rocking movement upon the part of the rock-shaft as will result in a depression of the clutch-sleeve against the tendency of its supporting-spring, and hence a disengagement is effected between the clutch-sleeve and teeth of the seed plate or disk. In this manner although the driving mechanism be operating, yet the feed mechanism is at rest.

Arranged under the yoke, and concaved in its upper side to fit the same, is a gear-box 28, having opposite rounded ends. The upper side of the gear-box has cast thereon, at each side of its concavity, a transverse rib 29, said ribs engaging between the flanges of the yoke-frame. At each side of the center of the yoke-frame vertical openings 30 are provided, and depending through these openings and through similar flanged openings in the gear-box is a pair of short vertical shafts or bolts 31. The upper ends of the bolts or shafts 31 are headed or upset, as shown, and they rest upon triangular washers 32, through which the shafts or bolts pass and which are supported by the yoke-frame between its flanges. On each of the bolts or shafts, near their lower ends, there is located for loose rotation an intermeshing combined spur and beveled gear 33. One of these combined spur and beveled gears has rigidly connected to or formed on its upper side a small spur-gear 34, and the same meshes with and drives a similar spur-gear 35, that is located on and moves with the drive-shaft of the seed-disk. Applied to the under side of the box 28 is a cover-section 36, the same being perforated to receive the lower ends of the bolts or shafts 31, and to the lower ends of said shafts, below the cover, nuts 37 are applied, the same serving to bind the cover tightly against the under side of the gear-box 28.

The opposite ends of the gear-box 28 and its cover are provided mutually with elliptical slots 38, and above and below the slots the gear-box and its cover are provided with overhanging flanges 39, whose inner surfaces are segmentally grooved, forming curved ways 40. In each pair of the curved ways 40 a curved shield 41 is located and adapted to slide, each of said curved shields being provided with a circular opening at its center.

Passing through the circular openings of each of the shields is a short axle 42, the inner end of which is flattened to produce a shank 43, in which a vertical eye 44 is formed, through which the bolt or shaft 31 nearest thereto passes. In this manner it will be seen that the two short axles are independently and pivotally supported at their inner ends upon the bolts or shafts 31 and are adapted at their outer ends to swing as far as permitted by the slots 38.

45 designates the concavo-convex steel covering-disks, the same being provided with hubs 46, adapted to revolve around the axles 42. The inner ends of the hubs are elongated and consequently pass through the circular holes in the shields and into the gear-box 28, where they terminate short of the bolts or shafts 31. The inner end of each hub has formed thereon or may be provided with a small beveled gear-wheel or pinion 47, and each of said gear-wheels or pinions intermeshes with the adjacent combined beveled and spur gear 33.

Located at the inner side and within the channel of the outer extremities of the yoke-frame is a metal block 48, and the same is provided with a transverse flange or rib 49. Arranged at the inner side of each of the blocks and adapted to move laterally with the flange or rib as a guide is a curved journal-plate 50. This journal-plate is provided with an elongated opening or slot $50^a$ and is in transverse alinement with openings $50^b$, formed in the block and frame, and through the same passes an adjusting-bolt 51. The bolt is provided at its outer end with a nut 52, and the same serves not only to clamp these parts together, but also retains the lower ends of a bowed brace 53, the upper end of which is secured to the handle-bar and may be to brace 3. By loosening the nuts on the bolts the plates may be slid backward or forward and secured at any adjustment by the said nuts. The lower end of each plate, near its rear edge, is provided with a bearing-opening 54, and the same supports the outer end of that axle upon which the hub of the adjacent covering-disk is loosely mounted. Beyond the two journal-plates the shafts or journals that carry the covering-disks may be perforated to receive split retaining-pins 55, or some other means may be provided for this purpose.

56 designates the usual scraper-blades, the same being formed of yielding spring metal and bolted at any suitable point to the framework.

This completes the invention, with the exception of the usual seed-spout 57, that is located between the frame-bars 3 below the discharge-opening in the hopper and which at its lower end lies directly back or in rear of the furrow-opening shovel, so as to deposit seed in the bottom of the furrow as the same is formed.

It will be seen that to secure an adjustment of the steel covering-disks so as to bring their rear portions in proper relations it is merely necessary to loosen the nuts on the bolts that secure the curved journal-plates. This being accomplished, the operator may by hand swing the outer ends of the journals or shafts to the front or rear, so that the covering-disks will assume a desired relation. The journal-plates are segmentally curved concentric with the shafts or bolts 31, so as to readily permit of such movement, and the gears carried by the inner ends of the hubs of the covering-disks will thereby always maintain a proper operative position with reference to the gears 33, so that the driving mechanism is most positive in its operation. The curved guard-plates, it will be understood, are employed merely for the purpose of rendering the gear-box as near dust-proof as possible by covering the elongated openings in the gear-box and through which the shafts or journals pass. Of course in any movements of the shafts or journals the guard-plates travel in the grooved flanges, as will be obvious.

When the machine is in operation, motion is conveyed from the disks and their hubs to to the combined beveled and spur gears 33, and, inasmuch as these mesh, the movement of one disk independent of its companion will cause the same result. By means of the two spur-gears this motion is transmitted to the drive-shaft, as shown, and by the clutch mechanism rotary motion is imparted to the seed-disk.

It will be observed that by the means herein shown and described I attain the various objects of my invention in that the seed mechanism is operated in a positive manner through the medium of the covering-disks; that I have provided a most convenient means for pivotally supporting and affording adjustment to the disks and their shafts or journals; that all gearing is of a simple nature and fully protected from dust and grit, and, finally, that I avoid all binding of the parts during adjustment and have provided a simple means whereby while the drive mechanism may be continuously operated, yet its action upon the seed mechanism may be regulated at will.

I do not limit my invention to the precise details of construction herein shown and described, but hold that I may vary the same to any degree and extent within the knowledge of the skilled mechanic without departing from the spirit or sacrificing any of the advantages of the invention.

Having described my invention, what I claim is—

1. In a planter, the combination with a frame and a hopper carrying a feed mechanism, of two independent, horizontally-swinging, non-rotatable axles pivoted at their disconnected inner ends, and adjustably supported at their outer ends, covering-disks having elongated hubs rotating on said axles and each provided at the inner end with a gear-wheel and gearing connecting said hub-gears with the feed mechanism, substantially as specified.

2. In a planter, the horizontally-divided gear-box having elongated shaft-openings in its ends, curved guideways at its ends, apertured plates sliding in said ways, and shaft-openings in the top, substantially as specified.

3. In a planter, the combination with a frame and a superimposed hopper carrying the feed mechanism, of a rotary drive-shaft for transmitting motion to said mechanism, a gear on the lower end of the shaft, opposite adjustable axles, supports for the same, covering-disks rotatably arranged on the axles and provided with hubs each having a gear-wheel at its inner end, a train of gearing for transmitting motion from the hub-gears to the gear of the operating-shaft, and a gear-box for covering all of said gearing, substantially as specified.

4. In a planter, the combination with a frame, a superimposed hopper and a feed mechanism carried thereby, of a drive-shaft for the same, short shafts or axles arranged vertically at opposite sides of the drive-shaft, horizontal intermeshing gears carried by the short shafts, one of which gears carries a spur-gear, an intermeshing spur-gear carried by the drive-shaft, a pair of laterally-adjustable axles, rotatable gears at the inner ends of the same engaging the intermeshing gears on said vertical shafts, and a pair of covering-disks carried by and turning on the axles and carrying said rotatable gears, substantially as specified.

5. In a planter, the combination with a frame, a hopper carrying a feed mechanism, and a rotary drive-shaft for operating the same, of a pair of independent adjustable axles pivoted at their inner ends at opposite sides of the drive-shaft to swing horizontally, covering-disks arranged loosely on the axles, and means for conveying motion from the hubs of the covering-disks to the operating-shaft, substantially as specified.

6. In a planter, the combination with a frame, a hopper carrying feed mechanism, and a drive-shaft for the same, of opposite independent horizontally-swinging axles pivoted at their inner ends, and means for adjustably supporting their outer ends, covering-disks turning on the axles between their pivots and adjusting means, and means for conveying motion from the hubs of the covering-disks to the operating-shaft, substantially as specified.

7. In a planter, the combination with a frame, a superimposed hopper carrying a feed mechanism, and a drive-shaft for the same, a spur-gear carried by the shaft, short shafts arranged at opposite sides of the operating-shaft, beveled gears carried by the latter, one of which is provided with a spur-gear intermeshing with that of the opposite shaft, of opposite axles pivoted on the short shafts, adjustable bearing-plates receiving the outer ends of the axles and connected to the frame, and covering-disks carried by the axles and having the inner ends of their hubs extended and provided with beveled gears engaging those of the short shaft, substantially as specified.

8. In a planter, the combination with the curved transverse frame, the gear-box secured to the center thereof and having opposite slotted ends, the short shafts journaled in the gear-box, beveled gears loosely mounted on the short shafts and a spur-gear mounted rigidly on one of the beveled gears, a superimposed hopper carrying a feed mechanism, a drive-shaft for operating the same journaled in the hopper and gear-box, a spur-gear arranged on the drive-shaft and intermeshing with that of the short shaft, and curved guard-plates arranged for sliding on the ends of the box and adapted to cover the slots therein, of opposite axles loosely connected at their inner ends to the short shaft, adjustable supports for the outer ends of the axles, and covering-disks arranged loosely on the axles and having their hubs at their inner ends projected through the guard-plates or shields and provided at their inner ends with beveled gears intermeshing with those of the short shafts, substantially as specified.

9. In a planter, the combination with a transverse frame, a gear-box secured thereto and having opposite parallel overhanging flanges provided with grooves, and between the same having elliptical slots, a superimposed hopper having a rotary feed mechanism, a drive-shaft connected thereto and journaled centrally in the box, and at its lower end provided with a gear-wheel, short shafts arranged at opposite sides of the drive-shaft, intermeshing combined beveled and spur gears loosely arranged on the short shafts, one of said beveled gears having fixedly mounted thereon a gear-wheel intermeshing with that of the drive-shaft, and curved shields or guard-plates mounted for movement in the overhanging grooved flanges and covering the slots in the ends of the gear-box, opposite independent short axles pivoted at their inner ends to the short shafts, means for adjustably supporting the outer ends of the axles and covering-disks loosely mounted on the axles and having their hubs inwardly extended through openings in the shields or guard-plates and provided with beveled gears engaging those of the short shafts, substantially as specified.

10. In a planter, the combination with the curved yoke-frame, the superimposed hopper and the vertical drive-shaft loosely journaled in the center of the frame, of a pair of horizontally-swinging axles loosely pivoted at their inner ends to the frame, a pair of axle-supporting plates receiving the outer ends of the axles and provided with slots, adjusting-bolts passed through the ends of the frame and the slots of the plates, covering-disks arranged to revolve upon the axles and means for conveying motion from the covering-disks to the drive-shaft, substantially as specified.

11. In a planter, the combination with the curved yoke-frame, the superimposed hopper and the rotary drive-shaft journaled in the center of the frame, of opposite metal blocks applied to the ends of the frame and having transverse guide-ribs, plates arranged under the ribs and having elongated slots, adjusting-bolts passed through the slots and corresponding openings in the blocks and ends of the frame, opposite independent horizontally-swinging axles supported at their outer ends by the plates and at their inner ends pivotally connected to the frame at opposite sides of the drive-shaft, covering-disks arranged to rotate on the axles and means for conveying motion from said disks to the drive-shaft, substantially as specified.

12. In a planter, the combination with a frame, a superimposed hopper, a feed-disk rotatably mounted therein and having a central hub provided with an annular series of teeth, a drive-shaft journaled in the frame and feed-disk, means for giving motion to the shaft, and a toothed sleeve or collar adapted to rotate with and slide upon the shaft, of an expansion-spring interposed between the collar and a stop on the shaft and adapted to normally engage the teeth on the collar with those of the disk, an operating-rod and a device operated by the rod for depressing the collar against the spring and disengage the teeth of the collar and disk, substantially as specified.

13. In a planter, the combination with the curved yoke-frame, the superimposed hopper, the feed-disk adapted to rotate therein and having a central annularly-toothed hub, of a drive-shaft loosely journaled in the plate and frame, means for giving motion to the shaft, a flanged and toothed collar mounted for rotation with the shaft and adapted to slide thereupon, a spring for supporting the collar in operative engagement with the hub, a transverse rock-shaft journaled in the frame of the planter and having a central loop portion loosely embracing the collar and bearing on the flange, and at one side of its bearing having a crank-arm, and an operating-rod connected to the crank-arm and loosely supported by the handle-bar of the machine, substantially as specified.

In testimony whereof I affix my signature in presence of two witnesses.

JAMES DRUMMOND SCHOFIELD.

Witnesses:
L. A. SMITH,
L. J. GANNON.